(12) United States Patent
Hwang et al.

(10) Patent No.: US 12,400,791 B2
(45) Date of Patent: Aug. 26, 2025

(54) MULTILAYER ELECTRONIC COMPONENT (71) Applicant: SAMSUNG ELECTRO-MECHANICS CO., LTD., Suwon-si (KR)

(72) Inventors: Hyun Jun Hwang, Suwon-si (KR); Jin Kyung Park, Suwon-si (KR); Sun Il Jeong, Suwon-si (KR); Gil Yong Lee, Suwon-si (KR); Su Ji Kang, Suwon-si (KR); Mun Seong Jeong, Suwon-si (KR); Won Seok Jang, Suwon-si (KR); Jung Min Kim, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 296 days.

(21) Appl. No.: 18/127,226

(22) Filed: Mar. 28, 2023

(65) Prior Publication Data
US 2024/0161978 A1    May 16, 2024

(30) Foreign Application Priority Data

Nov. 15, 2022  (KR) ........................ 10-2022-0152271

(51) Int. Cl.
  H01G 4/008   (2006.01)
  H01G 4/30    (2006.01)

(52) U.S. Cl.
  CPC ............. *H01G 4/0085* (2013.01); *H01G 4/30* (2013.01)

(58) Field of Classification Search
  CPC ............................. H01G 4/30; H01G 4/0085
  See application file for complete search history.

(56) References Cited

U.S. PATENT DOCUMENTS

2022/0285094 A1*  9/2022  Matsumoto .............. H01G 4/10

FOREIGN PATENT DOCUMENTS

JP      2013-135095 A      7/2013
JP      2021100020 A  *   7/2021

* cited by examiner

*Primary Examiner* — Michael P McFadden
(74) *Attorney, Agent, or Firm* — MORGAN, LEWIS & BOCKIUS LLP (57) ABSTRACT A multilayer electronic component including: a body including a dielectric layer and internal electrodes; and external electrodes disposed outside the body and connected to the internal electrodes, wherein $1.5 \leq Hfs/Hfc \leq 5.0$ when the internal electrode includes hafnium (Hf), Hfc indicates an average Hf content (at %) in a center of the internal electrode, and Hfs indicates an average Hf content (at %) in the internal electrode, measured from the center of the internal electrode to an interface thereof in contact with the dielectric layer.

20 Claims, 6 Drawing Sheets

MULTILAYER ELECTRONIC COMPONENT

CROSS-REFERENCE TO RELATED APPLICATION(S)

This application claims benefit of priority to Korean Patent Application No. 10-2022-0152271 filed on Nov. 15, 2022 in the Korean Intellectual Property Office, the disclosure of which is incorporated herein by reference in its entirety.

BACKGROUND

1. Technical Field

The present disclosure relates to a multilayer electronic component.

2. Description of Related Art

A multilayer ceramic capacitor (MLCC), a multilayer electronic component, may be a chip-type condenser mounted on the printed circuit boards of various electronic products, such as an imaging device such as a liquid crystal display (LCD) or a plasma display panel (PDP), a computer, a smartphone or a mobile phone, to serve to charge or discharge electricity therein or therefrom.

The MLCC may be used as a component of various electronic apparatuses because the MLCC is small, has high capacitance, and is easily mounted. There has been increasing demand for the MLCC to have a smaller size and higher capacitance as each of various electronic devices such as a computer and a mobile device has a smaller size and higher output.

However, the MLCC is required to maintain equivalent capacitance even when having a smaller size, thus also requiring the dielectric layer and internal electrodes thereof to each have a smaller thickness and a multilayer structure. Capacitance of the MLCC may be proportional to a dielectric constant of the dielectric layer and an effective area of the internal electrodes, and inversely proportional to a thickness of the dielectric layer. Here, rather than increasing the relative dielectric constant of the dielectric layer, it may be easier to achieve the higher capacitance by allowing the dielectric layer and the internal electrodes to each have the smaller thickness and the multilayer structure or increase the effective electrode area by increasing connectivity of the internal electrode, and research thereon is thus being actively conducted.

In order for the MLCC to have a smaller thickness, technology for atomizing materials of the dielectric layer and internal electrodes is first required to be developed. When the material is atomized to have a nano-size, its melting point may be lower, which may lead to a lower heat-shrinkage onset temperature. In the case of a metal material, the lower heat-shrinkage onset temperature due to its reduced size may be higher than that of a ceramic material, resulting in a difference in a heat-shrinkage temperature of the dielectric layer and that of the internal electrode. As the difference in the heat-shrinkage temperature of the dielectric layer and that of the internal electrode is increased, the connectivity of the internal electrode may be lower during a sintering process thereof, which may cause lower electrical capacitance and lower reliability.

A currently-used method for reducing the difference in the heat-shrinkage temperature of the dielectric layer and that the internal electrode is to add nano-sized barium titanate ($BaTiO_3$) to the internal electrode as a co-material thereof. However, a large amount of barium titanate co-material may need be added in order for the internal electrode to have the smaller thickness. As a result, the internal electrode may have a lower film density, and the co-material may thus be absorbed into the dielectric layer to thus increase the thickness of the dielectric layer, thereby causing the lower capacitance. Accordingly, it is necessary to develop a new co-material having thermal stability higher than barium titanate.

SUMMARY

An aspect of the present disclosure may provide a multilayer electronic component having improved connectivity of an internal electrode.

However, the aspects of the present disclosure are not limited to that described in the description above, and may be more readily understood in the description of a specific exemplary embodiment of the present disclosure.

According to an aspect of the present disclosure, a multilayer electronic component may include: a body including a dielectric layer and internal electrodes; and external electrodes disposed outside the body and connected to the internal electrodes, wherein $1.5 \leq Hfs/Hfc \leq 5.0$ when the internal electrode includes hafnium (Hf), Hfc indicates an average Hf content (at %) in a center of the internal electrode, and Hfs indicates an average Hf content (at %) in the internal electrode, measured from the center of the internal electrode to an interface thereof in contact with the dielectric layer.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

In the drawings, a first direction may indicate a stack direction (or thickness T direction), a second direction may indicate a length L direction, and a third direction may indicate a width W direction.

Multilayer Electronic Component

Figure 1:
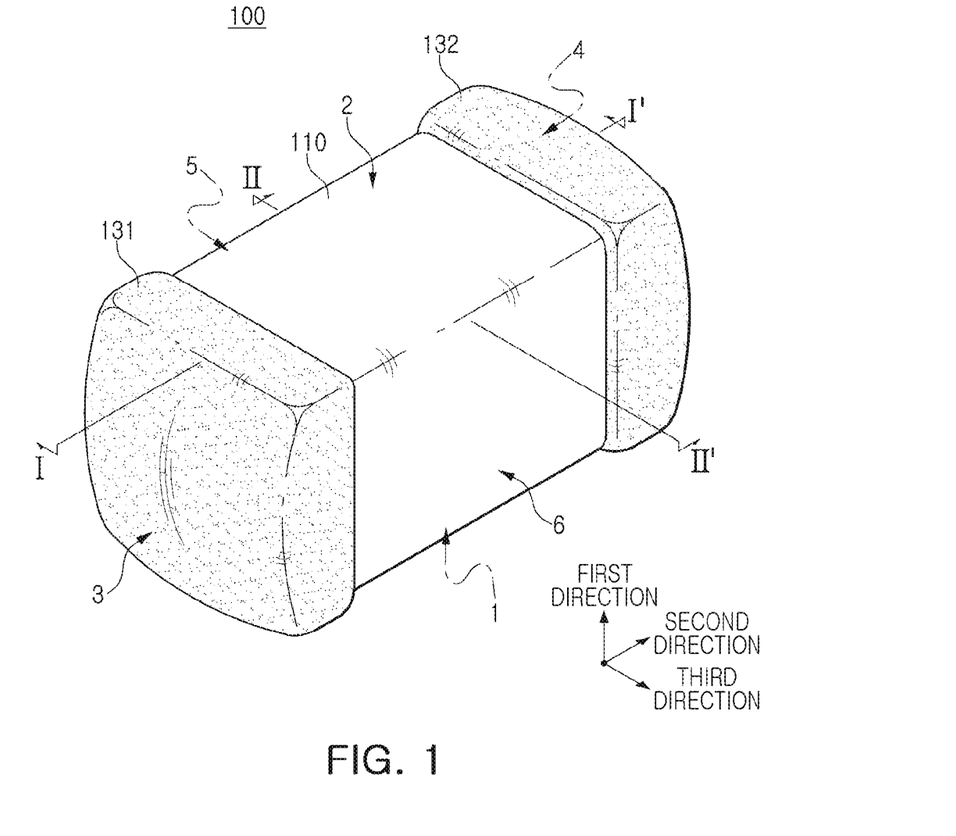
FIG. 1 schematically shows a perspective view of a multilayer electronic component which is an exemplary embodiment of the present disclosure.

FIG. 1 schematically shows a perspective view of a multilayer electronic component which is an exemplary embodiment of the present disclosure.

Figure 2:
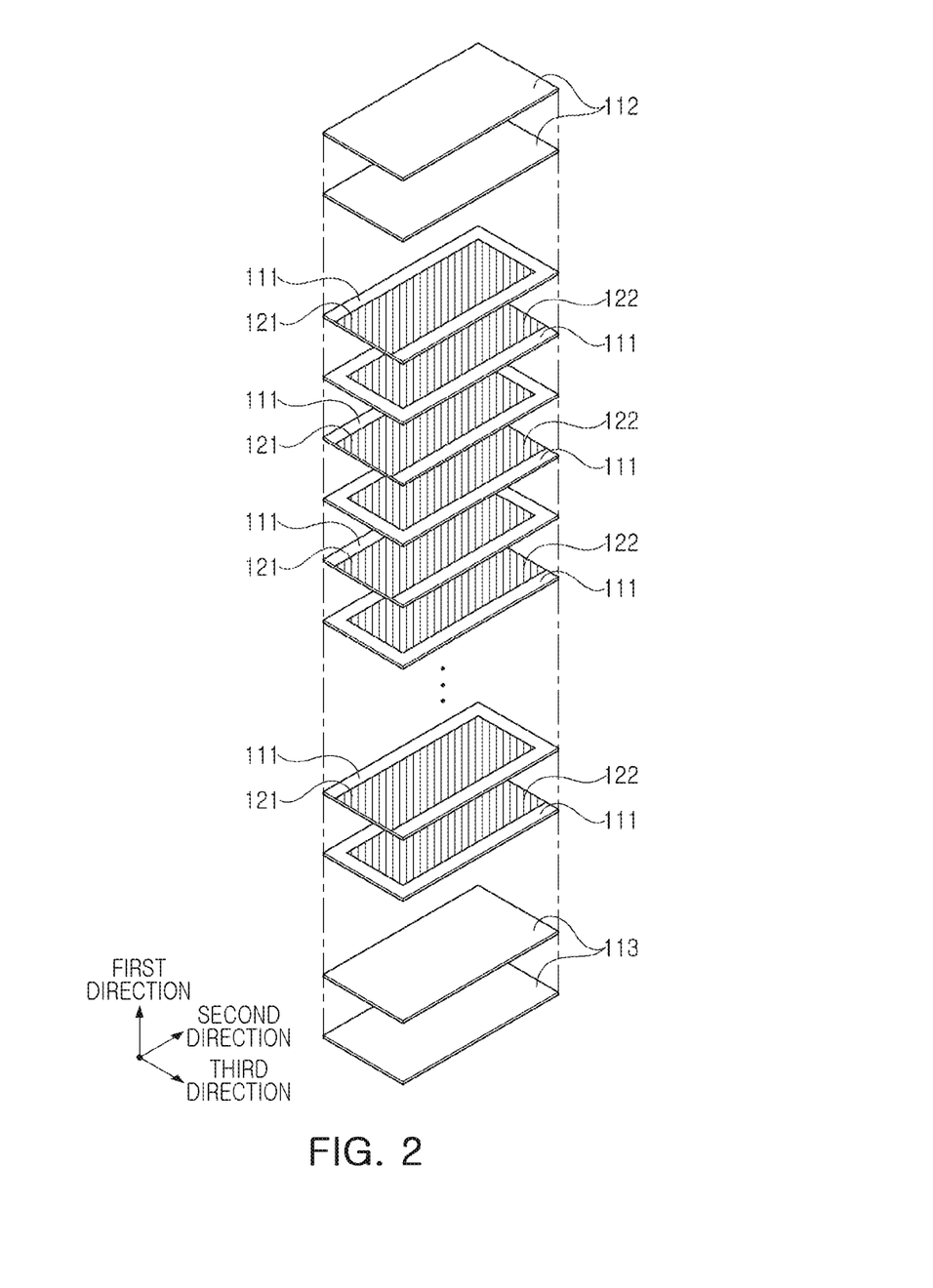
FIG. 2 schematically shows an exploded perspective view showing a stack structure of internal electrodes in FIG. 1.

FIG. 2 schematically shows an exploded perspective view showing a stack structure of internal electrodes in FIG. 1.

Figure 3:
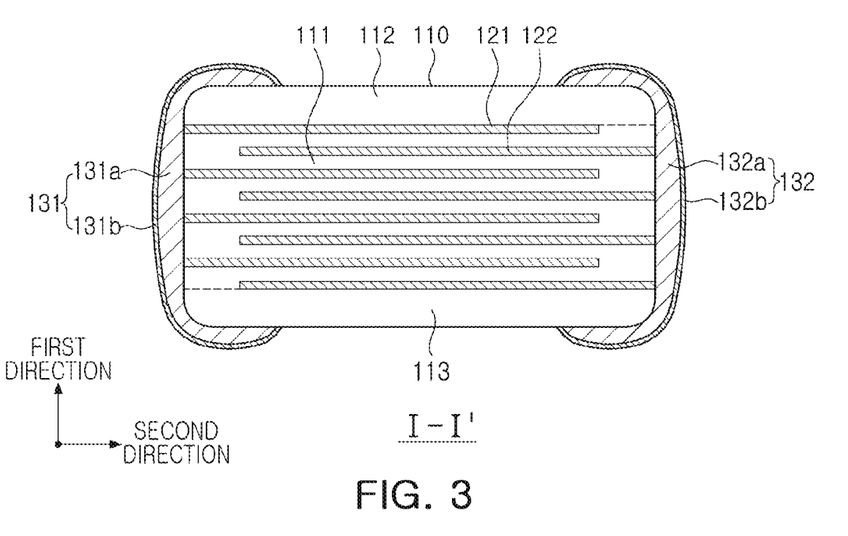
FIG. 3 schematically shows a cross-sectional view taken along I-I' in FIG. 1.

FIG. 3 schematically shows a cross-sectional view taken along I-I' in FIG. 1.

Figure 4:
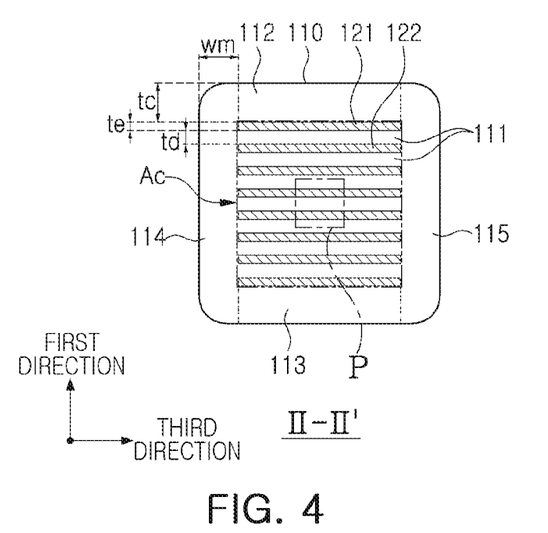
FIG. 4 schematically shows a cross-sectional view taken along line II-II' in FIG. 1.

FIG. 4 schematically shows a cross-sectional view taken along line II-II' in FIG. 1.

Figure 5:
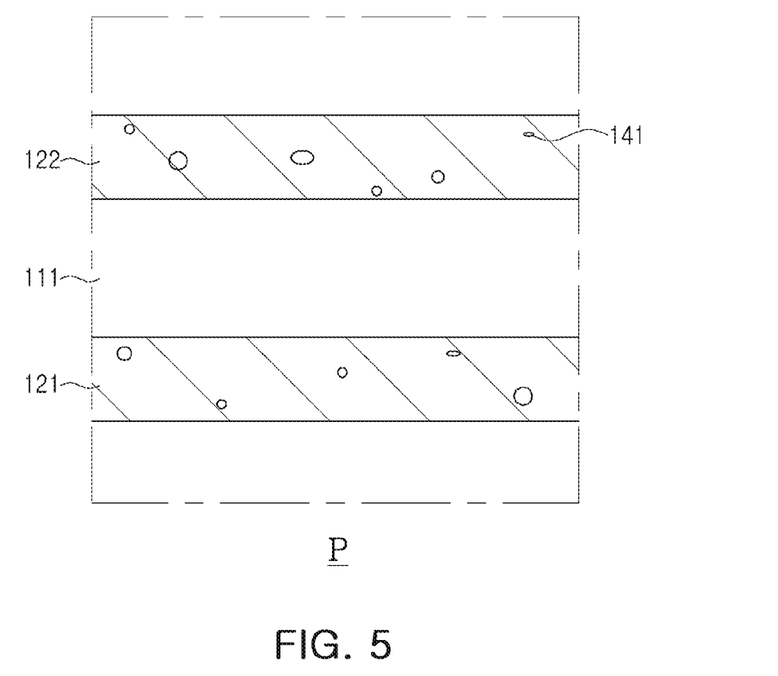
FIG. 5 schematically shows an enlarged view of region P in FIG. 4.

FIG. 5 schematically shows an enlarged view of region P in FIG. 4.

Figure 6A:
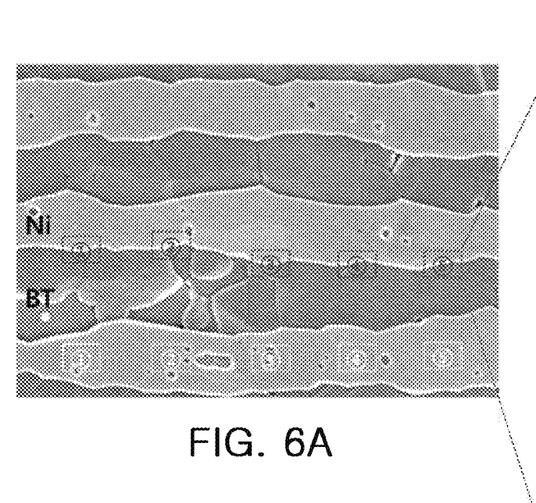
FIGS. 6A to 6C are graphs of the position and result of measuring an exemplary embodiment of the present disclosure by using a scanning electron microscopy-energy dispersive X-ray spectrometer (SEM-EDS)
Figure 6B:
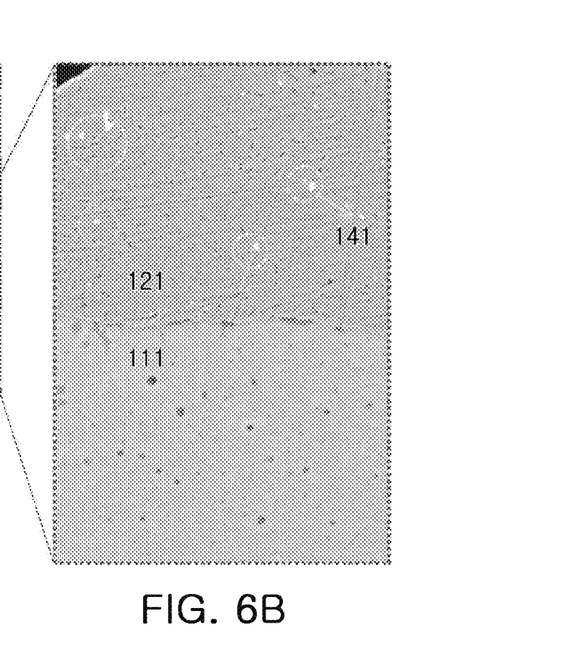
Figure 6C:
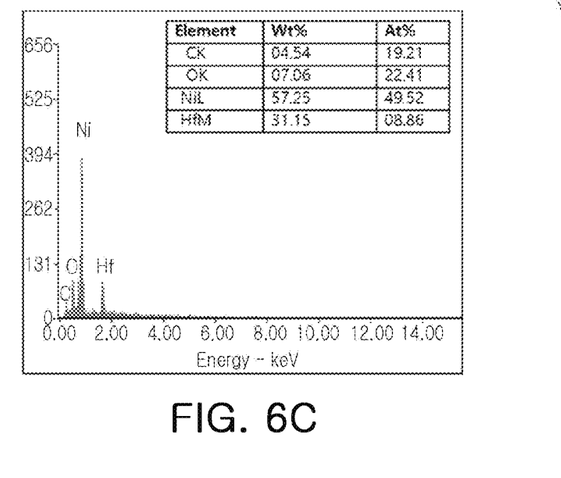

FIGS. 6A to 6C are graph of the position and result of measuring an exemplary embodiment of the present disclosure by using a scanning electron microscopy-energy dispersive X-ray spectrometer (SEM-EDS).

Figure 7:
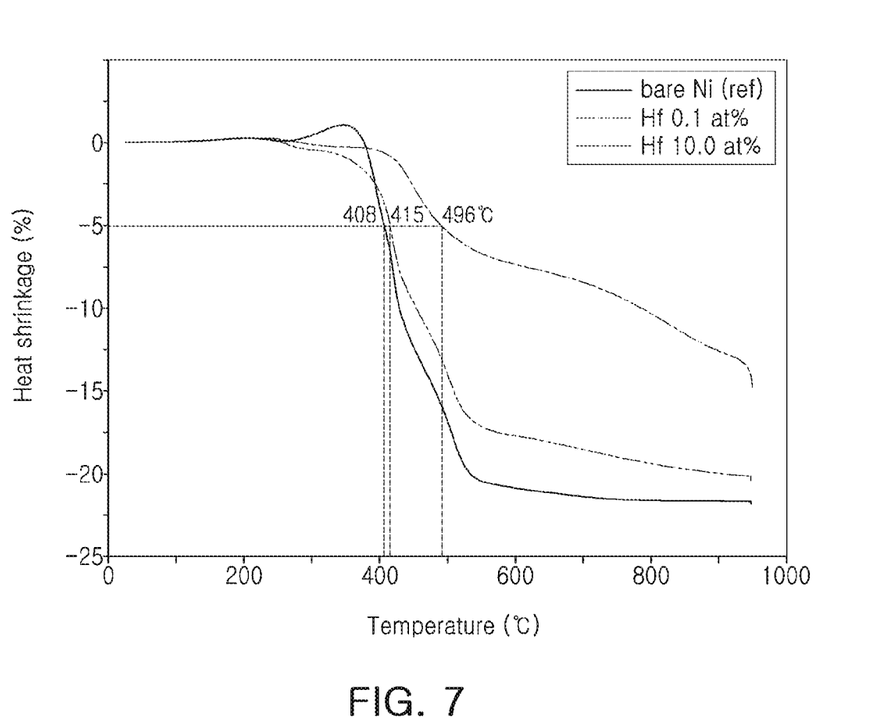
FIG. 7 is a graph showing a heat-shrinkage onset temperature based on a hafnium (Hf) content according to an exemplary embodiment of the present disclosure.

FIG. 7 is a graph showing a heat-shrinkage onset temperature based on a hafnium (Hf) content according to an exemplary embodiment of the present disclosure.

Hereinafter, the multilayer electronic component according to an exemplary embodiment of the present disclosure is described with reference to FIGS. 1 through 7.

A multilayer electronic component 100 according to an exemplary embodiment of the present disclosure may include: a body 110 including a dielectric layer 111 and internal electrodes 121 and 122; and external electrodes 131 and 132 disposed outside the body 110 and connected to the internal electrodes 121 and 122, wherein Hfs, 1.5≤Hfs/Hfc when the internal electrode 121 or 122 includes hafnium (Hf), Hfc indicates an average Hf content (at %) in the center of the internal electrode, and Hfs indicates an average Hf content (at %) in the internal electrode 121 or 122 that is measured from the center of the internal electrode to an interface thereof in contact with the dielectric layer 111.

The body 110 may include the dielectric layer 111 and the internal electrode 121 or 122, which are alternately stacked on each other.

In more detail, the body 110 may include an active part Ac disposed in the body 110 and forming capacitance by including first internal electrodes 121 and second internal electrodes 122 alternately disposed to face each other while having the dielectric layer 111 interposed therebetween.

The body 110 is not limited to a particular shape, and may have a hexahedral shape or a shape similar to the hexahedral shape, as shown in the drawings. The body 110 may not have the hexahedral shape having perfectly straight lines due to contraction of ceramic powders included in the body 110 in a sintering process, and have substantially the hexahedral shape.

The body 110 may include first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3 and 4 and opposing each other in the third direction.

The plurality of dielectric layers 111 included in the body 110 may be in a sintered state, and adjacent dielectric layers 111 may be integrated with each other so that boundaries therebetween are not readily apparent without using a scanning electron microscope (SEM).

A material included in the dielectric layer 111 is not particularly limited as long as the dielectric layer obtains sufficient capacitance. In general, the dielectric layer may use a perovskite ($ABO_3$)-based material, and may use, for example, a barium titanate-based material, a lead composite perovskite-based material, or a strontium titanate-based material. The barium titanate-based material may include barium titanate ($BaTiO_3$) based ceramic powders, and the ceramic powders may be, for example, $BaTiO_3$ or $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1), or $Ba(Ti_{1-y}Zr_y)O_3$ (0<y<1), in which calcium (Ca), zirconium (Zr), or the like is partially dissolved in $BaTiO_3$.

In addition, the raw material of the dielectric layer 111 may be prepared by adding various ceramic additives, organic solvents, binders, dispersing agents, and the like, to the powders such as the barium titanate ($BaTiO_3$) powders, based on an object of the present disclosure.

A thickness td of the dielectric layer 111 may not need to be particularly limited.

However, in order for the multilayer electronic component to more easily achieve a smaller size and higher capacitance, the dielectric layer 111 may have a thickness of 0.6 μm or less or 0.4 μm or less.

Here, the thickness td of the dielectric layer 111 may indicate the thickness td of the dielectric layer 111 disposed between the first and second internal electrodes 121 and 122.

Meanwhile, the thickness td of the dielectric layer 111 may indicate a size of the dielectric layer 111 in the first direction. In addition, the thickness td of the dielectric layer 111 may indicate the average thickness td of the dielectric layer 111, and may indicate an average size of the dielectric layer 111 in the first direction.

The average size of the dielectric layer 111 in the first direction may be measured by scanning an image of a cross-section of the body 110 in a first-second direction by using the scanning electron microscope (SEM) at a magnification of 10,000. In more detail, the average size of the dielectric layer 111 in the first direction may indicate an average value obtained by measuring the size of one dielectric layer 111 in the first direction at thirty equally spaced points in the scanned image in the second direction. The thirty equally spaced points may be designated in the active part Ac. In addition, it is possible to obtain the more general average thickness of the dielectric layer 111 in the first direction when measuring its average value by extending a measurement target of the average value to ten dielectric layers 111. Other methods and/or tools appreciated by one of ordinary skill in the art, even if not described in the present disclosure, may also be used.

The internal electrodes 121 and 122 may be alternately stacked while having the dielectric layer 111 interposed therebetween.

The internal electrodes 121 and 122 may include the first internal electrode 121 and the second internal electrode 122, and the first and second internal electrodes 121 and 122 may be alternately disposed to face each other while interposing the dielectric layer 111 included in the body 110 therebetween, and exposed to the third and fourth surfaces 3 and 4 of the body 110, respectively.

In more detail, the first internal electrode 121 may be spaced apart from the fourth surface 4 and exposed through the third surface 3, and the second internal electrode 122 may be spaced apart from the third surface 3 and exposed through the fourth surface 4. The first external electrode 131 may be disposed on the third surface 3 of the body 110 to be connected to the first internal electrode 121, and the second external electrode 132 may be disposed on the fourth surface 4 of the body 110 to be connected to the second internal electrode 122.

That is, the first internal electrode 121 may not be connected to the second external electrode 132 and connected to the first external electrode 131, and the second internal electrode 122 may not be connected to the first external electrode 131 and connected to the second external electrode 132. Here, the first and second internal electrodes 121 and 122 may be electrically separated from each other by the dielectric layer 111 interposed therebetween.

Meanwhile, the body 110 may be formed by alternately stacking a ceramic green sheet on which the first internal electrode 121 is printed and a ceramic green sheet on which the second internal electrode 122 is printed and then sintering the same.

The material for forming the internal electrodes 121 and 122 is not particularly limited, and may be a material having excellent electrical conductivity. For example, the internal electrode 121 or 122 may include at least one of nickel (Ni), copper (Cu), palladium (Pd), silver (Ag), gold (Au), platinum (Pt), tin (Sn), tungsten (W), titanium (Ti) and an alloy thereof.

In addition, the internal electrode 121 or 122 may be formed by printing, on the ceramic green sheet, a conductive paste for an internal electrode including at least one of nickel (Ni), copper (Cu), palladium (Pd), silver (Ag), gold (Au), platinum (Pt), tin (Sn), tungsten (W), titanium (Ti) and an alloy thereof. A method of printing the conductive paste for the internal electrodes may be a screen printing method, a gravure printing method, or the like, and the present disclosure is not limited thereto.

Meanwhile, it may be seen that one of main objects of a recent multilayer electronic component is to simultaneously achieve the smaller size and the higher capacitance. However, the multilayer electronic component is required to maintain its capacitance even when having the smaller size, thus also requiring the dielectric layer and the internal electrodes to each have a smaller thickness and a multilayer. In order for the multilayer electronic component to have a smaller thickness, technology for atomizing materials of the dielectric layer and internal electrodes is required to be first developed. When the material is atomized to have a nano-size, its melting point may be lower, which leads to a lower heat-shrinkage onset temperature. In a case of a metal material, the lower heat-shrinkage onset temperature due to its reduced size may be higher than that of a ceramic material, resulting in a difference in a heat-shrinkage temperature of the dielectric layer and that of the internal electrode. As the difference in the heat-shrinkage temperature of the dielectric layer and that of the internal electrode is increased, connectivity of the internal electrodes may be lower during a sintering process, which may cause lower electrical capacitance and reliability.

A method currently used in order to reduce the difference in the heat-shrinkage temperature of the dielectric layer and that the internal electrode is to add nano-sized barium titanate ($BaTiO_3$) as a co-material to the internal electrode. However, a large amount of barium titanate co-material may be added thereto in order for the internal electrode to have a smaller thickness. As a result, the internal electrode may have a lower film density, and the co-material may thus be absorbed into the dielectric layer to thus increase the thickness of the dielectric layer, thereby causing the lower capacitance.

Oxides having a melting point higher than barium titanate ($BaTiO_3$) are very diverse. However, oxides that may be applied are very restrictive because oxides are required not to be absorbed into the dielectric layer 111 during a high-temperature sintering, and required not to affect a dielectric constant even when absorbed. Hafnium oxide ($HfO_2$) has a melting point higher than that of barium titanate ($BaTiO_3$) by about 1100° C., and may thus cause a heat shrinkage delay of the internal electrodes 121 and 122 much more effectively than barium titanate ($BaTiO_3$) when added as a co-material 141 of the internal electrodes 121 or 122.

Aluminum oxide ($Al_2O_3$) also has a higher melting point than barium titanate ($BaTiO_3$). However, aluminum oxide ($Al_2O_3$) has a smaller atomic radius than that of titanium (Ti), and may thus form a secondary phase with a dielectric material to thus reduce the dielectric constant. Hafnium (Hf) may have an atomic radius greater than that of Ti. Therefore, hafnium (Hf) may not diffuse into the dielectric layer 111 during the high-temperature sintering not to affect the dielectric constant.

In an exemplary embodiment of the present disclosure, Hfs, $1.5 \leq Hfs/Hfc \leq 5.0$ when the internal electrode 121 or 122 includes hafnium (Hf), Hfc indicates an average Hf content (at %) in the center of the internal electrode 121 or 121, a first region indicates a region of the internal electrode 121 or 122 that ranges from the center of the internal electrode to an interface thereof in contact with the dielectric layer 111, and Hfs indicates an average Hf content (at %) in the first region.

The reason is that hafnium (Hf) which is a type of the co-material 141 of the internal electrode may cause a sintering delay during the sintering process, and reduce a difference in the heat shrinkage with the dielectric layer 111 as Hf moves toward the interface in contact with the dielectric layer, which is an outer direction of the internal electrode, thereby improving the connectivity of the internal electrode. Distribution of the co-material 141 in the internal electrode may be appropriately controlled based on conditions such as a heat treatment temperature and a sintering atmosphere.

Here, the center of the internal electrode may indicate a line connecting the centers of the internal electrodes 121 and 122 in the first direction, and the interface may indicate a line connecting areas where the internal electrode 121 or 122 and the dielectric layer 111 are in contact with each other.

Here, $1.5 \leq Hfs/Hfc \leq 5.0$ may be the average Hf content (Hfc at %) in the center of the internal electrode 121 or 122 and the average Hf content (Hfs at %) in the internal electrode 121 or 122 that is measured from the center of the internal electrode to the interface in contact with the dielectric layer 111. In this case, it is possible to improve the connectivity of the internal electrode, dielectric capacitance, break down voltage (BDV) and mean time to failure (MTTF).

A ratio (Hfs/Hfc) of the average Hf content (Hfs at %) that is measured from the center of the internal electrode to the interface in contact with the dielectric layer relative to the average Hf content (Hfc at %) in the center of the internal electrode may be less than 1.5. In this case, the internal electrode may have lower connectivity, thus failing to sufficiently secure an effective area of the internal electrode. The ratio (Hfs/Hfc) of the average Hf content (Hfs) that is measured from the center of the internal electrode to the interface in contact with the dielectric layer relative to the average Hf content (Hfc) in the center of the internal electrode may be more than 5.0. In this case, the internal electrode may have excellent connectivity. However, hafnium (Hf) may be excessively distributed at the interface between the internal electrode and the dielectric layer, resulting in a thick dielectric layer, which may cause lower capacitance, as well as lower BDV and lower MTTF.

In an exemplary embodiment of the present disclosure, the average Hf content (at %) included in the internal electrode 121 or 122 may be gradually increased from the center of the internal electrode toward the interface in contact with the dielectric layer 111.

In an exemplary embodiment of present disclosure, $1.5 \leq Hfs1/Hfc \leq 5.0$ when a second region indicates a region within 100 nm from the interface of the internal electrode that is in contact with the dielectric layer toward the center of the internal electrode, and Hfs1 indicates an average Hf content (at %) in the second region.

Meanwhile, an average Hf content included in the internal electrode 121 or 122 may be 20.0 at % or less.

The connectivity of the internal electrode may be improved even when a small amount of Hf co-material is added to the internal electrode, its lower limit is not particularly limited, and the average Hf content included in the internal electrode 121 or 122 may be 0.01 at % or more.

When the average Hf content included in the internal electrode 121 or 122 is more than 20.0 at %, the internal electrode may have excellent connectivity but with lower effective capacitance, BDV, and MTTF.

Referring to FIG. 7, when a temperature at which heat shrinkage of 5% occurs is evaluated as the heat-shrinkage onset temperature, it may be seen that 408° C. is a heat-shrinkage onset temperature of Comparative Example without addition of the Hf co-material while 415° C. is the heat-shrinkage onset temperature when hafnium (Hf) is added at 0.1 at %, which is about 7° C. higher than Comparative Example. When hafnium (Hf) is added at 10.0 at %, it may be seen that 496° C. is the heat-shrinkage onset temperature, which is about 88° C. higher than Comparative Example.

Due to the increased heat-shrinkage onset temperature, it possible to lower the difference in the heat-shrinkage onset temperature of the internal electrode and that of the dielectric layer, thereby improving the connectivity of the internal electrode and suppressing islanding of the internal electrode.

When the average Hf content included in the internal electrode is added on a weight percentage (wt %) basis, hafnium (Hf) may be added at 0.025 wt % or more and 50.0 wt % or less, based on, for example, a total weight of the components in the internal electrode.

In an exemplary embodiment of the present disclosure, when hafnium (Hf) included as the co-material of the internal electrode is present at 5.0 at % or more, hafnium (Hf) may be present in the form of oxide ($HfO_2$), and thus be easily detected during its measurement using the SEM-EDS. Other methods and/or tools appreciated by one of ordinary skill in the art, even if not described in the present disclosure, may also be used.

Here, an area where $HfO_2$ is detected may be 0.001% or more and 1.0% or less relative to that of the internal electrode. The area where $HfO_2$ is detected may be measured using the scanning electron microscopy-energy dispersive X-ray spectrometer (SEM-EDS). Other methods and/or tools appreciated by one of ordinary skill in the art, even if not described in the present disclosure, may also be used.

The content of hafnium (Hf) included in the internal electrode 121 or 122 may be measured using the scanning electron microscopy-energy dispersive X-ray spectrometer (SEM-EDS). The content (at %) of hafnium (Hf) may be based on a total content (100 at %) of C, 0, Ni, and Hf.

In more detail, referring to FIGS. 6A to 6C, the internal electrode may be observed by polishing the cross-sections of the multilayer electronic component in the first and second directions to a depth of about ½ in the third direction to thus measure a cross-section of the center of the active part Ac. Here, the measurement may be performed under conditions of an acceleration voltage of 5 to 10 kV and a working distance WD of 6.5 mm. Here, the content (at %) of the hafnium (Hf) element may be checked by adjusting measurement position of the internal electrode for three layers thereof to be seen, and by performing point-EDS analysis on a point where $HfO_2$ is trapped after measuring the five points ① to ⑤ each captured at an interval of 500 nm from the center of the first direction of the internal electrode in the second direction and five points ① to ⑤ each captured at the interval of 500 nm at points spaced apart from each other by 50 nm from the interface between the internal electrode and the dielectric layer toward the center of the internal electrode in the second direction into high-magnification images, as shown in the drawings. The point-EDS analysis may be performed by measuring the point where hafnium oxide ($HfO_2$) included in the internal electrode exists under conditions of an acceleration voltage of 5 kV and a WD of 5 to 8 mm. In this way, it is possible to measure the content of hafnium (Hf) included in the first region, which is a region including the center of the internal electrode and ranging from the center of the internal electrode to the interface in contact with the dielectric layer, obtain the average Hf content (at %) by calculating an average value of the measured Hf content, and obtain an area where hafnium oxide ($HfO_2$) is trapped. The area where hafnium oxide ($HfO_2$) is trapped may be measured within a cross-sectional area (e.g., 100 $nm^2$) of the internal electrode. The method of measuring the Hf content may be equally applied to the second region. Other methods and/or tools appreciated by one of ordinary skill in the art, even if not described in the present disclosure, may also be used.

Meanwhile, a thickness to of the internal electrode 121 or 122 may not need to be particularly limited.

However, in order for the multilayer electronic component to more easily achieve the smaller size and the higher capacitance, the internal electrode 121 or 122 may have a thickness of 0.6 μm or less or 0.4 μm or less.

Here, the thickness te of the internal electrode 121 or 122 may indicate a size of the internal electrode 121 or 122 in the first direction. In addition, the thickness te of the internal electrode 121 or 122 may indicate the average thickness te of the internal electrode 121 or 122, and indicate an average size of the internal electrode 121 or 122 in the first direction.

The average size of the internal electrode 121 or 122 in the first direction may be measured by scanning the image of the cross-section of the body 110 in the first-second direction by using the scanning electron microscope (SEM) at the magnification of 10,000. In more detail, the average size of the internal electrode 121 or 122 in the first direction may indicate an average value obtained by measuring the size of one internal electrode 121 or 122 in the first direction at thirty equally spaced points in the scanned image in the second direction. The thirty equally spaced points may be designated in the active part Ac. In addition, it is possible to obtain the more general average thickness of the internal electrode 121 or 122 in the first direction when measuring its average value by extending a measurement target of the average value to ten internal electrode 121 or 122. Other methods and/or tools appreciated by one of ordinary skill in the art, even if not described in the present disclosure, may also be used.

Meanwhile, the body 110 may include a cover part 112 or 113 disposed on each of two end surfaces of the active part Ac in the first direction.

In more detail, the cover parts 112 and 113 may include the upper cover part 112 disposed on an upper surface of the active part Ac in the first direction and the lower cover part 113 disposed on a lower surface of the active part Ac in the first direction.

The upper cover part 112 and the lower cover part 113 may respectively be formed by stacking one dielectric layer or two or more dielectric layers on the upper and lower surfaces of the active part Ac in the first direction, and basically serve to prevent the internal electrodes 121 and 122 from being damaged due to physical or chemical stress.

The upper or lower cover part 112 or 113 may include none of the internal electrode 121 or 122 and include the same material as the dielectric layer 111. That is, the upper or lower cover part 112 or 113 may include the ceramic material and include, for example, a barium titanate (BaTiO$_3$)-based ceramic material.

Meanwhile, a thickness tc of the cover part 112 or 113 may not need to be particularly limited.

However, in order for the multilayer electronic component to more easily achieve the smaller size and the higher capacitance, the thickness tc of the cover part 112 or 113 may be 100 μm or less or 30 μm or less, and may be 20 μm or less in a very small product.

Here, the thickness tc of the cover part 112 or 113 may indicate a size of the cover part 112 or 113 in the first direction. In addition, the thickness tc of the cover part 112 or 113 may indicate the average thickness tc of the cover part 112 or 113, and indicate an average size of the cover part 112 or 113 in the first direction.

The average size of the cover part 112 or 113 in the first direction may be measured by scanning the image of the cross-section of the body 110 in the first-second direction by using the scanning electron microscope (SEM) at the magnification of 10,000. In more detail, the average size of the cover part 112 or 113 in the first direction may indicate an average value obtained by measuring the size of one cover part 112 or 113 in the first direction at thirty equally spaced points in the scanned image in the second direction. The thirty equally spaced points may be designated in the upper cover part 112. In addition, it is possible to obtain the more general average thickness of the cover part 112 or 113 in the first direction when measuring its average value by extending a measurement target of the average value to the lower cover part 113. Other methods and/or tools appreciated by one of ordinary skill in the art, even if not described in the present disclosure, may also be used.

Meanwhile, margin portions 114 and 115 may be disposed on two end surfaces of the body 110 in the third direction.

In more detail, the margin portions 114 and 115 may include the first margin portion 114 disposed on the fifth surface 5 of the body 110 and the second margin portion 115 disposed on the sixth surface 6 of the body 110. That is, the margin portion 114 or 115 may be disposed on each of the two end surfaces of the body 110 in the third direction.

As shown in the drawings, the margin portion 114 or 115 may indicate a region between an end of the first or second internal electrode 121 or 122 in the third direction and a boundary surface of the body 110 based on a cross-section of the body 110 cut in a second-third direction.

The margin portion 114 or 115 may basically serve to prevent the internal electrode 121 or 122 from being damaged due to the physical or chemical stress.

The margin portion 114 or 115 may be formed by applying the conductive paste on the ceramic green sheet except where the margin portion 114 or 115 are to be formed to thus form the internal electrode 121 or 122, cutting the stacked internal electrodes 121 or 122 to be exposed to the fifth or sixth surface 5 or 6 of the body 110 to suppress a level difference caused by the internal electrode 121 or 122, and stacking one dielectric layer 111 or two or more dielectric layers 111 on each of the two end faces in the third direction of the active part Ac in the third direction.

Meanwhile, a width wm of the first or second margin portion 114 or 115 may not need to be particularly limited.

However, in order for the multilayer electronic component to more easily achieve the smaller size and the higher capacitance, the width wm of the first or second margin portion 114 or 115 may be 100 μm or less or 30 μm or less, and may be 20 μm or less in a very small product.

Here, the width wm of the margin portion 114 or 115 may indicate a size of the margin portion 114 or 115 in the third direction. In addition, the width wm of the margin portion 114 or 115 may indicate the average width wm of the margin portion 114 or 115, and indicate an average size of the margin portion 114 or 115 in the third direction.

The average size of the margin portion 114 or 115 in the third direction may be measured by scanning an image of a cross-section of the body 110 in a first-third direction by using the scanning electron microscope (SEM) at the magnification of 10,000. In more detail, the average size of the margin portion 114 or 115 in the third direction may indicate an average value obtained by measuring the size of one margin portion 114 or 115 in the third direction at thirty equally spaced points in the scanned image in the first direction. The thirty equally spaced points may be designated in the first margin portion 114. In addition, it is possible to obtain the more general average thickness of the margin portion 114 or 115 in the third direction when measuring its average value by extending a measurement target of the average value to the second margin portion 115. Other methods and/or tools appreciated by one of ordinary skill in the art, even if not described in the present disclosure, may also be used.

An exemplary embodiment of the present disclosure describes that the multilayer electronic component 100 includes two external electrodes 131 and 132. However, the number, shape or the like of the external electrode 131 or 132 may depend on a shape of the internal electrode 121 or 122 or another purpose.

The external electrodes 131 and 132 may be disposed on the body 110 and respectively be connected to the internal electrodes 121 and 122.

In more detail, the external electrodes 131 and 132 may include the first and second external electrodes 131 and 132 respectively disposed on the third and fourth surfaces 3 and 4 of the body 110, and respectively connected to the first and second internal electrodes 121 and 122. That is, the first external electrode 131 may be disposed on the third surface 3 of the body 110 and connected to the first internal electrode 121, and the second external electrode 132 may be disposed on the fourth surface 4 of the body 110 and connected to the second internal electrode 122.

The external electrode 131 or 132 may be made of any material having the electrical conductivity, such as a metal, may use a specific material determined in consideration of electrical characteristics, structural stability or the like, and may have a multilayer structure.

For example, the external electrodes 131 and 132 may respectively include electrode layers 131a and 132a disposed on the body 110 and plating layers 131b and 132b disposed on the electrode layers 131a and 132a.

As a more specific example of the electrode layer 131a or 132a, the electrode layer 131a or 132a may be a fired electrode including a conductive metal and glass, or a resin-based electrode including the conductive metal and a resin.

In addition, the electrode layer 131a or 132a may be formed by sequentially disposing the fired electrode and the resin-based electrode on the body.

In addition, the electrode layer 131a or 132a may be formed by transferring a sheet including the conductive metal to the body or by transferring the sheet including the conductive metal to the fired electrode.

The conductive metal used for the electrode layer 131a or 132a is not particularly limited as long as the conductive metal is the material which may be electrically connected to the internal electrode 121 or 122 to form the capacitance. For example, the conductive metal may include at least one selected from the group consisting of nickel (Ni), copper (Cu), palladium (Pd), silver (Ag), gold (Au), platinum (Pt), tin (Sn), tungsten (W), titanium (Ti) and an alloy thereof. The electrode layer 131a or 132a may be formed by applying and then sintering a conductive paste prepared by adding glass frit to conductive metal powders.

The plating layer 131b or 132b may serve to improve a mount characteristic of the multilayer electronic component.

The plating layer 131b or 132b is not limited to a particular type, may include at least one of nickel (Ni), tin (Sn), palladium (Pd) and an alloy thereof, or may include a plurality of layers.

As a more specific example of the plating layer 131b or 132b, the plating layer 131b or 132b may include a nickel (Ni) plating layer or a tin (Sn) plating layer, may include the Ni plating layer and the Sn plating layer sequentially formed on the electrode layer 131a or 132a, or may include the Sn plating layer, the Ni plating layer and the Sn plating layer sequentially formed on the electrode layer 131a or 132a. Alternatively, the plating layer 131b or 132b may include the plurality of Ni plating layers and/or the plurality of Sn plating layers.

Although an exemplary embodiment of present disclosure is described in detail above, the present disclosure is not limited to an exemplary embodiment described above and the accompanying drawings, and is limited by the appended claims. Therefore, it is apparent that various modifications and variations could be made by those skilled in the art without departing from the scope and spirit of the present disclosure as defined by the appended claims. These modifications should also be understood to fall within the scope of the present disclosure.

Hereinafter, the present disclosure is described in more detail based on Example and Comparative Example. However, these Examples are to assist in better understanding of the present disclosure, and the scope of the present disclosure is not limited to Example.

Example

Table 1 below corresponds to measured data of the connectivity, effective capacitance, BDV, and MTTF of the internal electrode based on the trap area and content of the hafnium (Hf) included in the internal electrode.

Sample 1 is Comparative Example without hafnium (Hf) which is the co-material of the internal electrode. The connectivity, effective capacitance, BDV, and MTTF of the internal electrode are evaluated as reference values, and are each set to one (1) to compare values based on a relative scale.

The connectivity of the internal electrode indicates a ratio of an unbroken length of the internal electrode to a total length of the internal electrode after drawing an imaginary line within any internal electrode in the length direction (second direction). The connectivity of the electrode is measured using MIA toolkit v2.1, and the center of a cross-section of each of four sample chips in the first-third direction is analyzed under the same condition. In a preprocessing, an image obtained by polishing the cross-section of the sample chip in the first-third direction to the depth of ½ in the second direction, and then optically measured at a magnification of 200 is used. As described above, the connectivity of the internal electrode is indicated as the ratio by measuring the unbroken length of the internal electrode among the total straight lines of the internal electrode in the second direction, observed in the image scanned for each sample.

The capacitance characteristic is measured using Kesight's E4980A model under conditions of 1 kHz and 0.5V (AC), and capacitance values of 50 samples are measured to calculate the average of the values. To prepare a measurement sample, the measurement is performed after the sample is heat-treated at 150° C. and aged at a room temperature for 2 hours.

The BDV characteristics of 50 samples are measured to thus calculate an average value. The BDV is measured under a 100V/s step-up condition, and is determined as defective when a measured insulation resistance (IR) value falls to $10^4 \Omega$ or below compared to a reference insulation resistance.

For mean time to failure (MTTF) evaluation, a high-temperature load test is conducted at a temperature condition of 125° C. and a voltage condition of 1.2 V. During the measurement, a time when the insulation resistance value is decreased to $10^5 \Omega$ or less compared to an initial insulation resistance is measured as the failure time to thus calculate the mean time to failure (MTTF) of the sample. The number of measurement samples is set to ten to thus calculate an average value.

TABLE 1

| Sample No. | Hf trap area % | Hf content at % | Connectivity of internal electrode | Effective capacitance | BDV | MTTF |
|---|---|---|---|---|---|---|
| 1 | 0 | 0.00 | 1 | 1 | 1 | 1 |
| 2 | 0.001 | 0.01 | 1.04 | 1.02 | 1.03 | 1.05 |
| 3 | 0.010 | 1.0 | 1.12 | 1.07 | 1.10 | 1.14 |
| 4 | 0.100 | 10.0 | 1.17 | 1.10 | 1.14 | 1.22 |
| 5 | 1.000 | 20.0 | 1.23 | 1.05 | 1.15 | 1.31 |
| 6 | 5.000 | 30.0 | 1.35 | 0.85 | 1.07 | 1.10 |

Referring to Table 1, it may be seen that the internal electrode has improved connectivity and electrical characteristic even when a small amount of hafnium (Hf) which is the co-material is added thereto. Referring to Samples 2 to 5, it may be seen that the internal electrode has the connectivity, capacitance, BDV, and MTTF superior to those of Sample 1 until the Hf content reaches to 20.0 at %. However, referring to Sample 6, it may be seen that the internal electrode has excellent connectivity, but with the lower effective capacitance when the Hf content is 30.0 at %. This result may be interpreted that the lower effective capacitance is caused by the increased thickness of the dielectric layer due to the addition of an excessive amount of a Hf co-material.

Table 2 below shows the electrical characteristics (e.g., effective capacitance or BDV characteristic) and reliability evaluation data (e.g., MTTF) of the sample chip based on the ratio (Hfs/Hfc) of the Hf content (at %) in the internal electrode at its interface in contact with the dielectric layer relative to the Hf content (at %) in the center of the internal electrode, and each evaluation criterion is calculated by evaluating Hfs/Hfc=1.5 as a reference value.

Here, each sample is evaluated based on the Hf content of 10.0 at % in the center of the internal electrode.

TABLE 2

| Sample No. | Hfs/Hfc | Connectivity of internal electrode | Effective capacitance | BDV | MTTF |
|---|---|---|---|---|---|
| 7 | 1.0 | 0.93 | 0.98 | 0.87 | 0.85 |
| 8 | 1.5 | 1 | 1 | 1 | 1 |
| 9 | 3.0 | 1.07 | 1.12 | 1.02 | 1.18 |
| 10 | 5.0 | 1.12 | 1.04 | 1.05 | 1.12 |
| 11 | 7.0 | 1.14 | 0.85 | 1.06 | 1.10 |

The table above shows the effective capacitance and reliability of the MLCC based on the ratio (Hfs/Hfc) of the Hf content at the interface of the internal electrode relative to the Hf content in the center of the internal electrode. When the ratio (Hfs/Hfc) is 1.0 as in Sample 7, it may be seen that the internal electrode has slightly lower connectivity, lower BDV, and lower MTTF than Sample 8. This phenomenon can be interpreted to resultantly occur because the internal electrode fails to sufficiently secure the effective area due to the lower connectivity of the internal electrode.

When the ratio (Hfs/Hfc) is 1.5 or more and 5.0 or less as in Samples 8 and 10, a difference in a heat shrinkage behavior of the internal electrode and that of the dielectric layer is reduced, thereby increasing the connectivity of the internal electrode and further increasing the capacitance, the BDV, and the MTTF.

However, when the ratio (Hfs/Hfc) is 7.0 as in Sample 11, it may be seen that the internal electrode has the excellent connectivity, but with a lower capacitance and a lower MTTF because Hf is excessively distributed at the interface between the internal electrode and the dielectric layer, which results in a thick dielectric layer.

As set forth above, the present disclosure may provide the multilayer electronic component having the improved connectivity of the internal electrode by adding hafnium (Hf) as the co-material of the internal electrode.

However, various and beneficial advantages and effects of the present disclosure is not limited to the description above, and may be more readily understood in the description of the specific exemplary embodiment of the present disclosure.

While the exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including a dielectric layer and internal electrodes including hafnium (Hf); and
external electrodes disposed outside the body and connected to the internal electrodes,
wherein 1.5≤Hfs/Hfc≤5.0, Hfc indicates an average Hf content (at %) in a center of at least one of the internal electrodes, and Hfs indicates an average Hf content (at %) in the at least one of the internal electrodes measured from the center of the at least one of the internal electrodes to an interface between the at least one of the internal electrodes and the dielectric layer.

2. The component of claim 1, wherein the average Hf content (at %) included in the at least one of the internal electrodes increases from the center of the at least one of the internal electrodes toward the interface.

3. The component of claim 1, wherein 1.5≤Hfs1/Hfc≤5.0, Hfs1 indicates an average Hf content (at %) in a region within 100 nm from the interface toward the center of the internal electrode.

4. The component of claim 1, wherein the average Hf content included in the at least one of the internal electrodes is 0.01 at % or more and 20.0 at % or less.

5. The component of claim 4, wherein the average Hf content included in the at least one of the internal electrodes is 5.0 at % or more and 20.0 at % or less.

6. The component of claim 5, wherein Hf is present as hafnium oxide.

7. The component of claim 6, wherein an area of hafnium oxide included in the at least one of the internal electrodes is 0.001% or more and 1.0% or less relative to that of the at least one of the internal electrodes.

8. The component of claim 1, wherein an average Hf content (wt %) included in the at least one of the internal electrodes is 0.025 wt % or more and 50.0 wt % or less.

9. The component of claim 1, wherein the at least one of the internal electrodes has an average thickness of 0.6 μm or less.

10. The component of claim 9, wherein the dielectric layer has an average thickness of 0.6 μm or less.

11. The component of claim 1, wherein the body includes first and second surfaces opposing each other in a first direction, third and fourth surfaces connected to the first and second surfaces and opposing each other in a second direction, and fifth and sixth surfaces connected to the first to fourth surfaces and opposing each other in a third direction,
an active part forming capacitance by including the internal electrodes alternately disposed in the first direction while having the dielectric layer interposed therebetween, and
a cover part disposed on each of two end surfaces of the active part opposing each other in the first direction.

12. The component of claim 11, wherein the body further includes a margin portion disposed on each of two end surfaces of the body opposing each other in the third direction.

13. A multilayer electronic component comprising:
a body including a dielectric layer and internal electrodes including hafnium oxide; and
external electrodes disposed outside the body and connected to the internal electrodes,
wherein an area of the hafnium oxide included in the at least one of the internal electrodes is 0.001% or more and 1.0% or less relative to that of the at least one of the internal electrodes.

14. The component of claim 13, wherein 1.5≤Hfs/Hfc≤5.0, Hfc indicates an average Hf content (at %) in a center of at least one of the internal electrodes, and Hfs indicates an average Hf content (at %) in the at least one of the internal electrodes measured from the center of the at least one of the internal electrodes to an interface between the at least one of the internal electrodes and the dielectric layer.

15. The component of claim 14, wherein 1.5≤Hfs1/Hfc≤5.0, Hfs1 indicates an average Hf content (at %) in a region within 100 nm from the interface toward the center of the internal electrode.

16. The component of claim 13, wherein an average Hf content included in the at least one of the internal electrodes is 0.01 at % or more and 20.0 at % or less.

17. The component of claim 13, wherein the at least one of the internal electrodes has an average thickness of 0.6 μm or less.

18. The component of claim 13, wherein the dielectric layer has an average thickness of 0.6 μm or less.

19. The component of claim 13, wherein the body includes first and second surfaces opposing each other in a first direction, third and fourth surfaces connected to the first and second surfaces and opposing each other in a second direction, and fifth and sixth surfaces connected to the first to fourth surfaces and opposing each other in a third direction,
- an active part forming capacitance by including the internal electrodes alternately disposed in the first direction while having the dielectric layer interposed therebetween, and
- a cover part disposed on each of two end surfaces of the active part opposing each other in the first direction.

20. The component of claim 19, wherein the body further includes a margin portion disposed on each of two end surfaces of the body opposing each other in the third direction.

\* \* \* \* \*